US005505106A

United States Patent [19]

Herman

[11] Patent Number: 5,505,106

[45] Date of Patent: Apr. 9, 1996

[54] ADJUSTABLE TIE-ROD ASSEMBLY FOR A MOTOR VEHICLE

[75] Inventor: Slawomir J. Herman, Rochester, Mich.

[73] Assignee: Chrysler Corporation, Auburn Hills, Mich.

[21] Appl. No.: 331,407

[22] Filed: Oct. 31, 1994

[51] Int. Cl.[6] .................... G05G 1/21

[52] U.S. Cl. .................... 74/586; 74/579 R; 384/276

[58] Field of Search .................... 74/579 R, 585, 74/586, 587, 588; 280/95.1, 661; 384/276, 296

[56] References Cited

U.S. PATENT DOCUMENTS

| | | | |
|---|---|---|---|
| 2,584,687 | 2/1952 | Fidler | 74/586 |
| 2,648,997 | 8/1953 | Sawyer | 74/586 |
| 3,319,488 | 5/1967 | Bentley et al. | 74/586 |
| 3,439,946 | 4/1969 | Gottschald et al. | 74/586 |
| 4,012,967 | 3/1977 | Warren | 74/586 |

*Primary Examiner*—Charles A. Marmor
*Assistant Examiner*—Chong H. Kim
*Attorney, Agent, or Firm*—Edward A. Craig

[57] ABSTRACT

An adjustable tie-rod assembly for an automotive vehicle has inner and outer rod end sections, and an intermediate rod section. The intermediate and inner rod end sections are rotatably connected together. The intermediate rod section is threaded on the outer rod end section and a jam nut maintains this connection. A stud projects laterally outwardly from the outer rod end section for connection to a steering arm.

5 Claims, 2 Drawing Sheets

ADJUSTABLE TIE-ROD ASSEMBLY FOR A MOTOR VEHICLE

FIELD OF THE INVENTION

This invention relates generally to an adjustable tie-rod assembly for a motor vehicle.

BACKGROUND AND SUMMARY OF THE INVENTION

Proper front wheel alignment requires the correct setting of all of the interrelated suspension angles affecting the running and steering of the front wheels of a vehicle. Among the factors involved in front wheel alignment is toe-in. Toe-in is measured in degrees or inches. Toe-in is the difference in the distance between the front edges and the distance between the rear edges of the tires.

Correct toe-in is maintained by adjustable tie-rods. One such tie-rod construction in service has inner and outer tie-rod sections connected by an adjustment sleeve. The adjustment sleeve is threaded to both tie-rod sections. Jam nuts on the threaded ends of the tie-rod sections are tightened and torqued against the sleeve to maintain the adjustment. A stud on the outer tie-rod section must be perpendicular to the tie-rod so that the stud will be in a neutral or "0" position when it is attached to the steering arm in order to be at the proper angle to accommodate movement of the vehicle suspension. To make an adjustment requires four tools, namely, a wrench to turn the sleeve for adjustment purposes, two wrenches to apply torque to the jam nuts for tightening, and a tool to hold the stud so that the end of the outer tie-rod section is in proper position with the stud perpendicular to the axis of the tie-rod. The jam nuts in this construction can loosen and thereby destroy the adjustment.

The tie-rod assembly of the present invention is easier to adjust, requires fewer tools to accomplish the adjustment, and is not prone to loosening because the two tie-rod end sections are free to turn relative to one another. Since the parts can rotate, the problem of locking them together to make sure there is the proper perpendicular relationship is avoided because the tie-rod will be self-adjusting during use. In other words, it will seek a position where there is no torsional load. The present invention has the further advantage of eliminating one of the jam nuts.

In accordance with the specific embodiment about to be described, there are inner, outer and intermediate rod sections. The intermediate and inner rod sections are rotatably connected together. The intermediate rod section is threaded on the outer rod section and a jam nut maintains this connection.

One of the objects of this invention is to provide a tie-rod assembly having the foregoing features.

Another object is to provide a tie-rod assembly which is composed of a relatively few simple parts, is relatively inexpensive, is easy to manufacture, assemble and adjust, can be adjusted with the use of fewer tools and is not prone to loosen or require frequent readjustment.

Other objects, features and advantages of the invention will become more apparent as the following description proceeds, especially when considered together with the accompanying claims and drawings.

DETAILED DESCRIPTION

Figure 1:
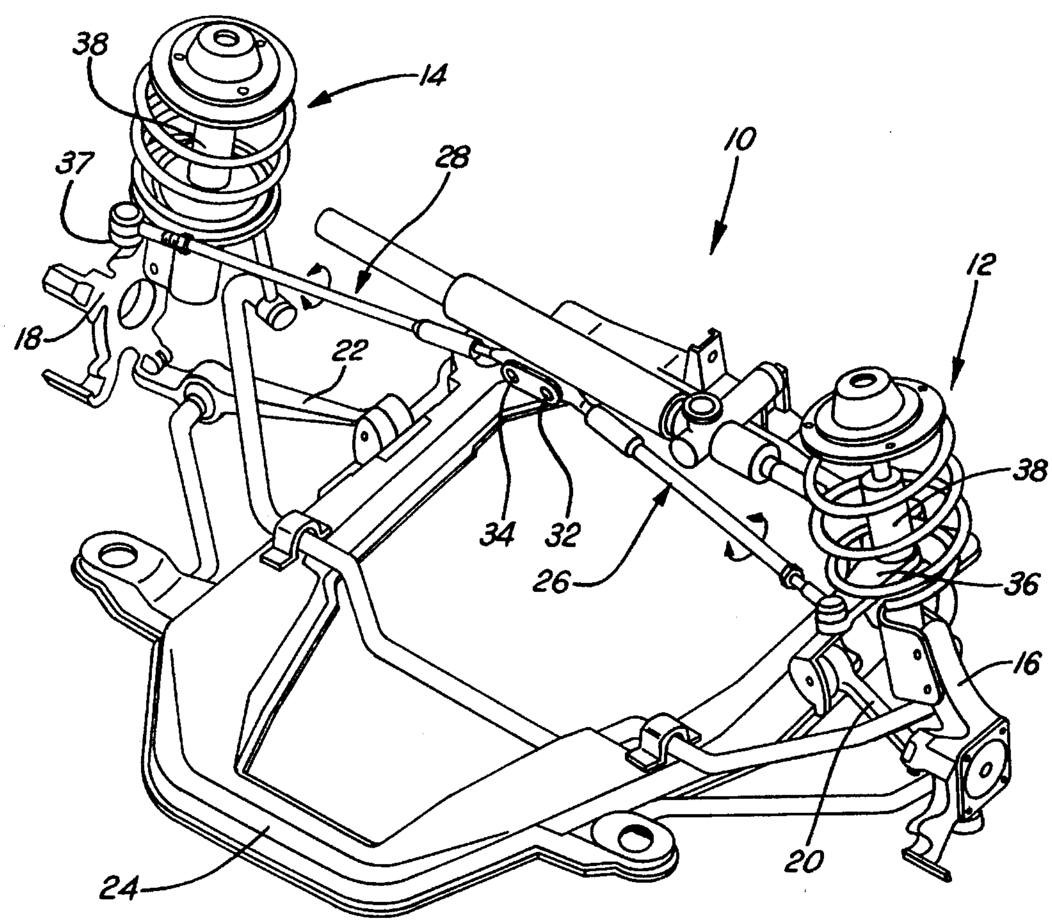
FIG. 1 is a perspective view of a portion of the front suspension of an automobile, having tie-rod assemblies constructed in accordance with the invention.
Figure 4:
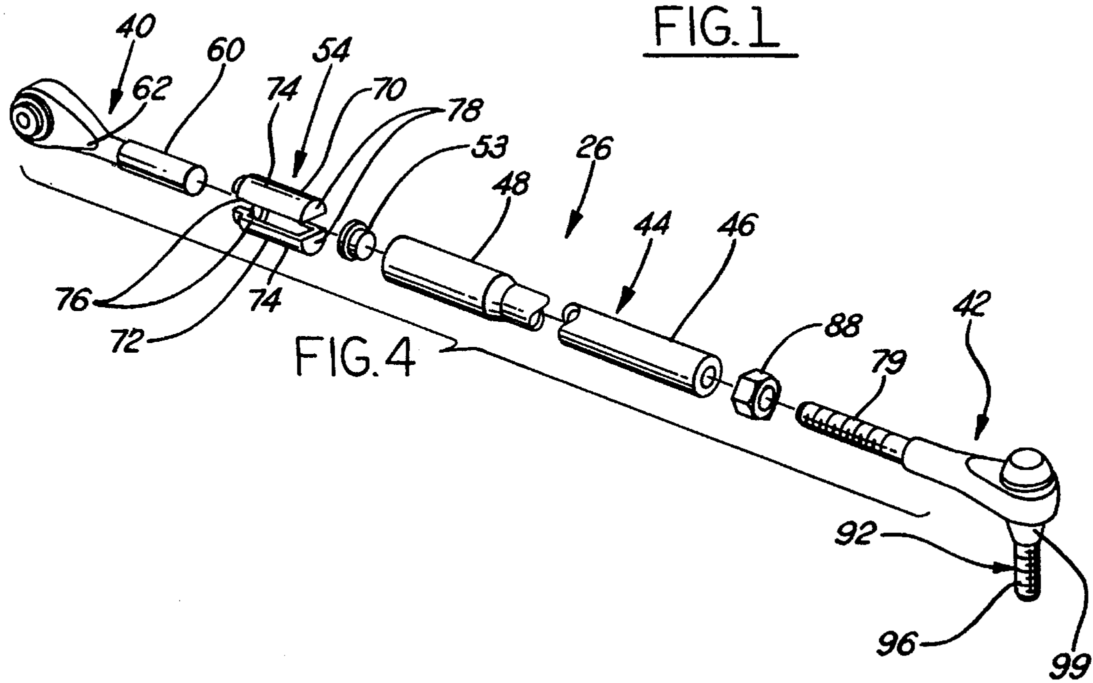
FIG. 4 is an exploded view in perspective showing the parts of one of the tie-rod assemblies.
Figures 2, 3, 5, 6:
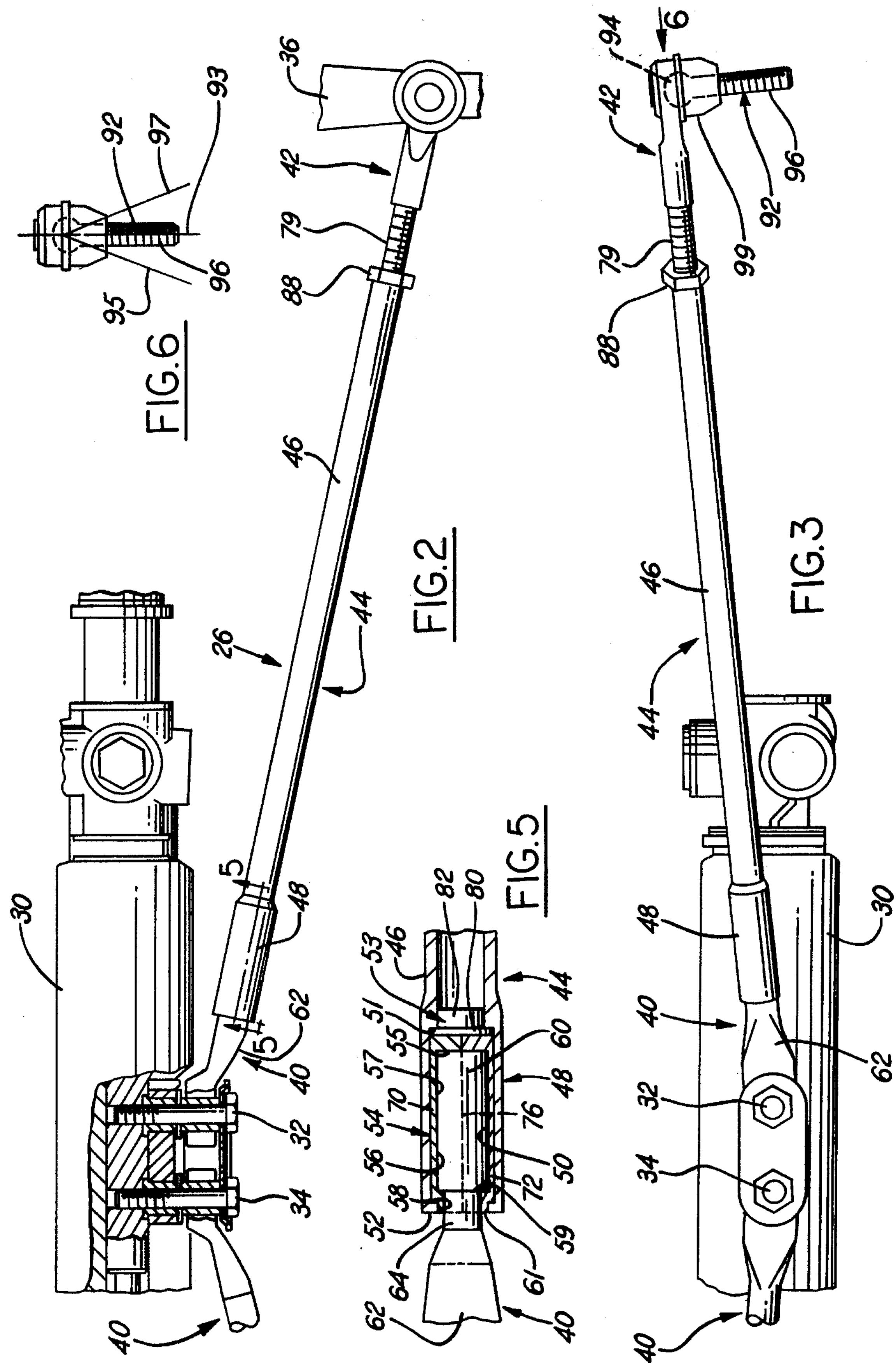
FIG. 2 is an enlarged fragmentary view as seen from above and with parts in section, showing one of the tie-rod assemblies.
FIG. 3 is a view as seen from the rear, showing the structure of FIG. 2.
FIG. 5 is a fragmentary sectional view taken on the line 5—5 in FIG. 2.
FIG. 6 is a view looking in the direction of the arrow 6 in FIG. 3.

Referring now more particularly to the drawings, and especially to FIGS. 1 and 2, the front suspension 10 of an automobile is shown having strut assemblies 12 and 14, steering knuckles 16 and 18 secured to the respective strut assemblies 12 an 14, and lower control arms 20 and 22 pivoted to the respective steering knuckles 16 and 18 and also to the front cradle 24. Tie-rod assemblies 26 and 28 each have their inner ends pivoted to the steering gear 30 by pivots 32 and 34. The outer ends are pivoted to steering arms 36 and 37 extending outwardly from the struts 38 of the strut assemblies. The tie-rod assemblies 26 and 28 are identical and therefore only one will be described.

Tie-rod assembly 26 has an elongated inner tie-rod end section 40, an elongated outer tie-rod end section 42, and an elongated intermediate tie-rod section 44. The tie-rod sections 40, 42 and 44 are axially aligned.

The intermediate rod section 44 is an elongated tubular member which is straight throughout its length. The main body portion 46 of the intermediate rod section 44 is tubular and is axially aligned with and connects into the enlarged tubular inner end portion 48. The enlarged inner end portion 48 is cylindrical, that is, it is of uniform circular cross-section throughout its length. The radially inner annular wall 50 of the enlarged outer end portion 48 is of greater diameter than the radially inner annular wall of the main body portion 46 and at the point where these two portions connect, there is an annular radial shoulder 51. The inner end of the enlarged inner end portion 48 is open and a radially inwardly extending annular flange 52 extends part-way across the open inner end.

A bushing 54 is disposed in the enlarged cylindrical inner end portion 48 of the intermediate rod section 44, retained therein between an insert 53 and the flange 52. The flange 52 is turned radially inwardly after the bushing is inserted. The radially outer wall of the bushing is cylindrical and fits snugly within the inner wall 50 of the outer end portion 48. The bushing 54 has an axially elongated, hollow interior 56, the central axis of which is aligned with the central axes of rod sections 40,42 and 44. The hollow interior 56 has an annular side wall 57 which is cylindrical, that is, it is of uniform, circular cross-section throughout its length. The outer end of the hollow interior 56 is closed by a transverse wall 55 which is perpendicular to the axis of the tie-rod sections. The inner end of the hollow interior 56 has a transverse wall 59 which is also perpendicular to the axis of the tie-rod sections but formed with an opening 58. The wall 59 is thus annular and has an annular axial extension 61 extending through the flange 52 of the inner end portion 48 of the intermediate rod section 44.

The inner rod end section 40 has a somewhat elongated main body portion 62 and at the outer end has a neck 64 which terminates in an enlarged bearing 60. The bearing 60 is disposed in the cylindrical, hollow interior 56 of the bushing 54. The bearing is axially elongated and of the same cylindrical form as the cylindrical, hollow interior 56 of the bushing and is rotatable in the bushing. The extension 61 is sleeved over the neck 64 of the inner rod end section 40. The inner rod end section 40 has its inner end connected to one of the pivots 32, 34.

The bushing 54 is made up of radially opposed, substantially identical bushing parts or halves 70 and 72. The bushing parts 70,72 have semi-cylindrical side walls 74, the interiors of which are also semi-cylindrical and cooperate to define the side wall 57 of the cylindrical hollow interior 56 of bushing 54. The side edges 76 of each bushing part extend parallel to the central axis of the hollow interior 56 and respectively abut the side edges of the other bushing part. The ends of the bearing parts have end wall segments 78 which cooperate in defining the transverse walls 55 and 59.

The insert 53 in the intermediate rod section 44 has an annular, radially outwardly extending flange portion 80 disposed between and abutting the transverse wall 55 of bushing 54 and the shoulder 51. The insert has an integral plug 82 which fits within the main body portion 46 of the intermediate rod section 44.

The inner end portion 79 of the outer rod end section 42 is externally threaded. The outer end of the main body portion 46 of the intermediate rod section 44 is tubular and internally threaded. The externally threaded inner end portion of the outer rod end section 42 is threaded into the internally threaded tubular portion of the intermediate rod section 44. A jam nut 88 is threaded on the inner end portion of the outer rod end section 42 and is torqued into tight bearing engagement with the outer end of the main body portion 46 of the intermediate rod section 44 to prevent relative rotation between the outer rod end section 42 and the intermediate rod section 44.

A stud 92 extends laterally outwardly from the outer end portion of the outer rod end section 42. Stud 92 has a spherical head 94 which has a swivel fit in a spherical socket within the outer rod end section 42. The shank 96 of the stud is normally perpendicular to the rod end section 42 and is surrounded by a rubber grommet 99. The shank of the stud is threaded and adapted to threadedly engage the outer end of one of the steering arms 36,37.

As previously mentioned, a centerline 93 of the shank 96 of the stud 92 should assume a "0"at rest position as shown in FIG. 6. Lines 95 and 97 illustrate the range of travel of the stud 92 which occurs as a consequence of movement of the vehicle suspension. Centerline 93 should bisect the angle defined by these lines when the vehicle is not in use. The opposing suspension forces are in equilibrium when the stud 92 assumes the position shown. The tie rod is free to rotate to establish this position. In the past this has not been true because of the fixed nature of the jam nut securing system which has been used.

The tie-rod assembly of this invention is not prone to loosening or in need of frequent readjustment because of the free relative turning movement provided between the inner rod end section 40 and the intermediate rod section 44. As such, it is self-adjusting in use. The parts can rotate freely and therefore do not have to be locked together in any particular relationship. The parts will seek a position where there is no torsional load.

What is claimed is:

1. An adjustable tie-rod assembly for an automotive vehicle comprising, an elongated inner rod end section having a first end portion, an elongated tubular intermediate rod section having an enlarged tubular first end portion terminating in an open end and a tubular second end portion, a bushing within said tubular first end portion of said intermediate rod section and having a hollow interior, said inner rod end section having an enlarged bearing on said first end portion thereof rotatably received in the hollow interior of said bushing, an annular flange extending radially inwardly from the open end of said tubular first end portion of said intermediate rod section to retain said bushing in the hollow interior of said tubular first end portion, an elongated outer rod end section having a first end portion and a second end portion, means securing said first end portion of said outer rod end section to said second end portion of said intermediate rod section, said inner and outer rod end sections and said intermediate rod section having aligned axes, the hollow interior of said bushing being cylindrical and axially elongated and having a central axis aligned with said central axes, said bearing being axially elongated and of the same cylindrical form as the cylindrical, hollow interior of said bushing and rotatably received therein, said first end portion of said outer rod and section extending within said tubular second end portion of said intermediate rod section, said means securing said first end portion of said outer rod end section to said second end portion of said intermediate rod section comprising external threads on said first end portion of said outer rod end section and internal threads on said second end portion of said intermediate rod section which are threadedly engaged with one another, a jam nut threaded on said first end portion of said outer rod end section and advanced into jamming contact with the second portion of said intermediate rod section, and a stud projecting laterally outwardly from said second end portion of said outer rod end section.

2. An adjustable tie-rod assembly according to claim 1, wherein said bushing comprises radially opposed, substantially identical first and second bushing parts, said bushing parts each having a semi-cylindrical radially inner side wall, said semi-cylindrical side walls of said first and second bushing parts cooperating to define said cylindrical hollow interior of said bushing, each said bushing part having side edges which extend parallel to the central axis of the hollow interior of said bushing and respectively abut the side edges of the other bearing part.

3. An adjustable tie-rod assembly according to claim 2, wherein said enlarged tubular first end portion of said intermediate rod section has an annular, radially extending end wall at the end thereof opposite its open end, said tubular second end portion of said intermediate rod section has an inner wall opening into said enlarged tubular first end portion thereof through said annular, radially extending wall, and further including an insert in said enlarged tubular first end portion of said intermediate rod section abutting said bushing and said annular, radially extending wall, said insert having an integral plug fitting within said inner wall of said second end portion of said intermediate rod section.

4. An adjustable tie-rod assembly according to claim 3, wherein said first and second bushing parts each have a semi-cylindrical extension part of reduced diameter extending through said open end of said enlarged tubular first end portion of said intermediate rod section, said semi-cylindrical extension parts cooperating in defining a cylindrical extension of reduced diameter sleeved over said first end portion of said inner rod end section.

5. An adjustable tie-rod assembly for an automotive vehicle comprising, an elongated inner rod end section having a first end portion, an elongated tubular intermediate rod section having a tubular first end portion terminating in an open end and a second end portion, a bushing within said tubular first end portion of said intermediate rod section and having a hollow interior, said inner rod end section having a bearing on said first end portion thereof rotatably received in the hollow interior of said bushing, an annular flange extending radially inwardly from the open end of said tubular first end portion of said intermediate rod section to retain said bushing in the hollow interior of said tubular first end portion, an elongated outer rod end section having a first end portion and a second end portion, means securing said first end portion of said outer rod end section to said second end portion of said intermediate rod section, said means securing said first end portion of said outer rod end section to said second end portion of said intermediate rod section comprising external threads on said first end portion of said outer rod end section and internal threads on said second end portion of said intermediate rod section which are threadedly engaged with one another, a jam nut threaded on said first end portion of said outer rod end section and advanced into jamming contact with the second portion of said intermediate rod section, and a stud projecting laterally outwardly from said second end portion of said outer rod end section.

* * * * *